Dec. 25, 1962 J. H. TRACHT 3,070,645

CATALYST COATED THERMOCOUPLE ELEMENTS

Filed Sept. 12, 1961 2 Sheets-Sheet 1

INVENTOR.
JOSEPH H. TRACHT

BY

ATTORNEY

Dec. 25, 1962 J. H. TRACHT 3,070,645

CATALYST COATED THERMOCOUPLE ELEMENTS

Filed Sept. 12, 1961 2 Sheets-Sheet 2

INVENTOR.
JOSEPH H. TRACHT
BY
[signature]
ATTORNEY

United States Patent Office 3,070,645

Patented Dec. 25, 1962

3,070,645

CATALYST COATED THERMOCOUPLE ELEMENTS

Joseph H. Tracht, Pittsburgh, Pa., assignor to Gulf Research & Development Company, Pittsburgh, Pa., a corporation of Delaware Filed Sept. 12, 1961, Ser. No. 137,570
6 Claims. (Cl. 136—4)

Figure 1:
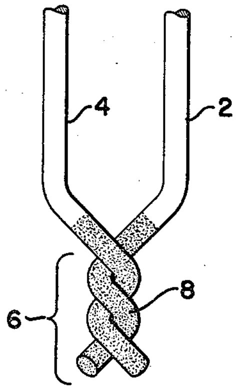

This invention relates to thermoelectric power generation and particularly to improved thermocouple devices for generation of thermoelectric power and to power generators containing the same.

Since the first observation of a thermoelectric effect by Seebeck, considerable effort has been directed toward the use of such effects to convert thermal energy directly into electrical energy. This interest stems from the fact that thermoelectric engines offer the attractive prospect of silent and trouble-free operation through the elimination of moving parts. As a result of these efforts a few, workable thermoelectric power generators actually have been developed for particular uses is regions where the importance of convenience is greater than that of cost. Although the practical conversion of thermal energy to electrical energy has been achieved on the limited scale indicated, it should be noted that the efficiency of a thermoelectric generator operating as a heat engine is less than that of a Carnot engine even in theory, and in practice up to the present time the efficiencies of such generators have been extremely small, usually less than one percent, although efficiencies as high as eight percent have been claimed.

The present invention relates to an improvement in thermoelectric generating devices by means of which significantly larger amounts of electrical power can be obtained from a given amount of available heat, whereby the power generating efficiencies of thermoelectric generators are markedly improved and their potential utility is expanded. It has been discovered that thermoelectric generators of such improved efficiency can be obtained by the use of thermocouples having a coating of a catalytic material on their hot junctions, said catalytic material being a material that is capable of promoting an exothermic reaction of fuel reactants contacted therewith. The thermocouples of this invention can be formed from any two dissimilar materials capable of producing thermoelectric effects. Excellent results for the purposes of the present invention are obtainable with conventional thermocouples, such as Chromel-Alumel, but a wide variety of other materials can be used. The nature of the catalytic material can vary in accordance with the fuel reactants and the temperatures at which the thermoelectric generator is operated. Platinum metal in a catalytic or large surface area form is an example of a catalytic material that has been found to give excellent results in the oxidation of hydrogen gas with air at ambient atmospheric temperatures, but other metals of the platinum group in catalytic form can be used with the same fuel reactants with good results, and still other materials can be used with other combinations of fuel reactants.

The improved power generation obtainable in accordance with the present invention is achieved by the improved thermocouples disclosed herein by concentration of available thermal energy in the location where the greatest advantage can be obtained therefrom, that is, the hot junction of the thermocouple itself.

Figure 2:
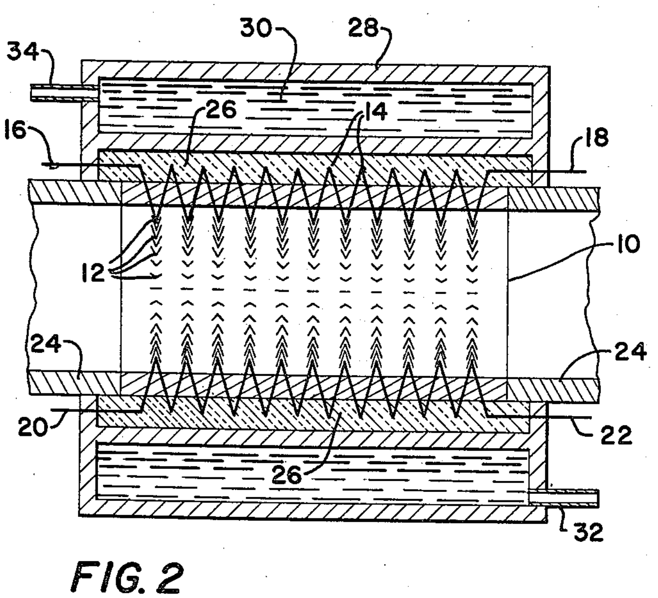
Figure 2A:
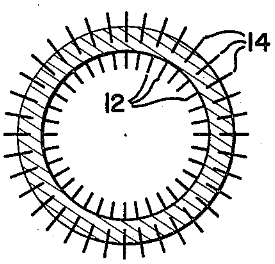
Figure 2B:
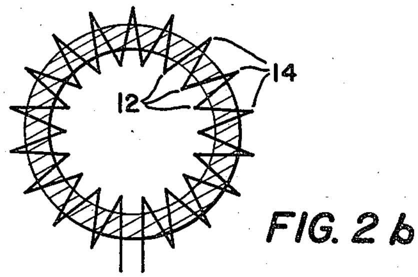
Figure 3:
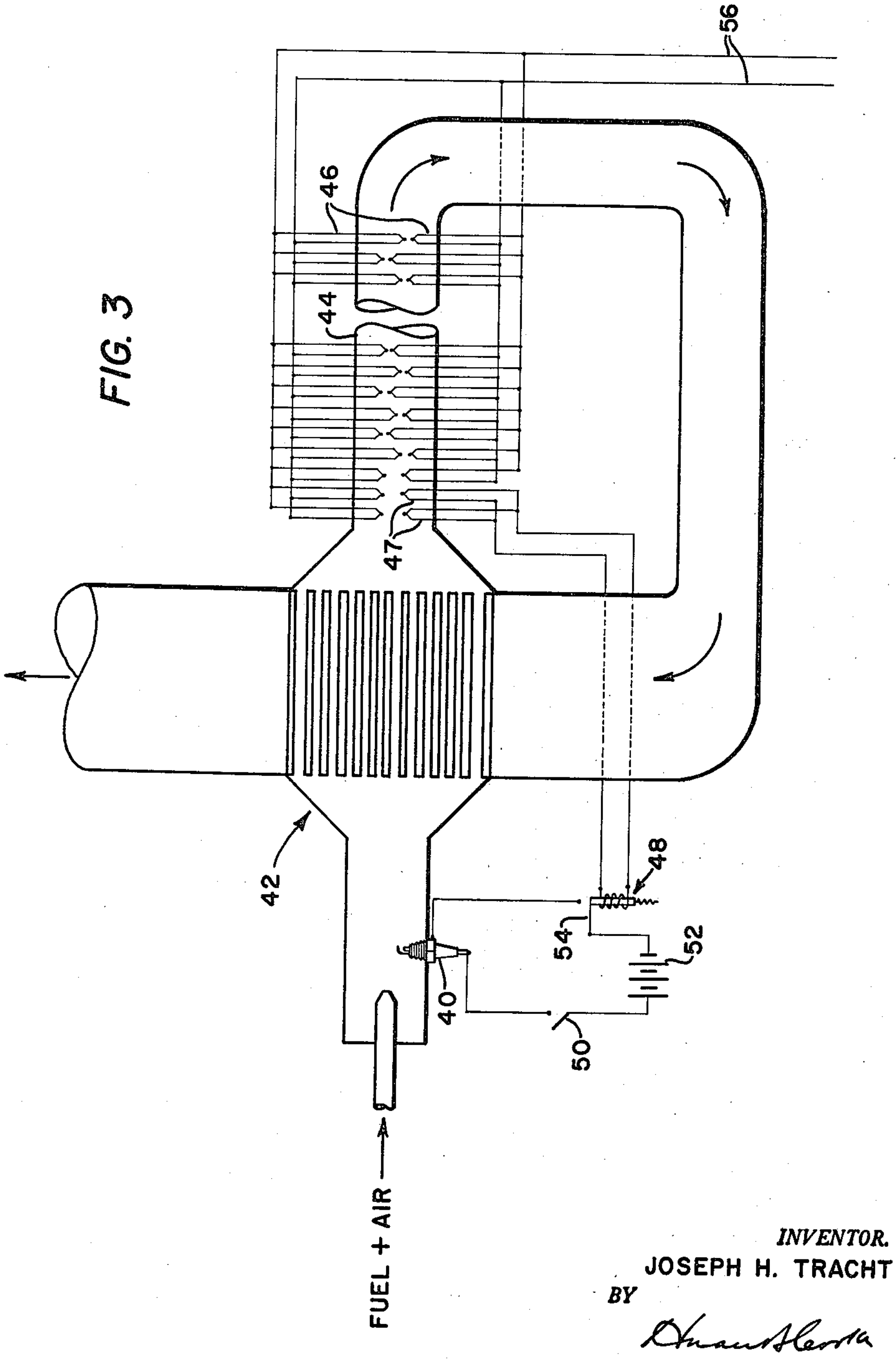

Referring briefly to the drawings, in FIGURE 1 there is shown an enlarged view of a thermocouple hot junction constructed in accordance with the present invention. In FIGURE 2 there is shown a side elevation, in vertical section, of a fragment of an exhaust line of a hydrocarbon combustion system and incorporating a thermopile embodying thermocouples prepared in accordance with the present invention. FIGURE 2(*a*) is a front elevation, in vertical section, of the thermopile element as such of the apparatus illustrated in FIGURE 2. FIGURE 2(*b*) is a front elevation, in vertical section, of a thermopile element having an alternative arrangement of thermocouples. FIGURE 3 is a diagrammatic illustration of an integral thermoelectric power generating system.

As pointed out above, any material that is effective to promote an exothermic reaction between the fuel reactants that are to be introduced to the thermoelectric generator can be used as the catalytic material of the present invention, and the particular catalyst selected can vary somewhat in accordance with the choice of fuel reactants and in accordance with the conditions under which the thermoelectric generator is operated. Catalytic materials capable of promoting oxidation reactions are most useful for the purposes of the present invention, as oxidation reactions are those most commonly employed to develop heat, but the invention is not limited to oxidative exothermic reactions. By way of illustration, good results are obtainable by the use of sponge platinum in oxidizing hydrogen gas with air at ambient atmospheric temperature. Examples of other catalytic materials that can be used are ruthenium, osmium, iridium, and palladium, as well as suitably prepared oxides of iron, cobalt, nickel, manganese, silver, and copper. Thus, in the oxidation of organic vapors, platinum and other metals of the platinum group, as well as catalytically active oxides of iron, cobalt, nickel, manganese and silver are useful. Catalytically active oxides of copper, nickel, and cobalt have been found useful in the oxidation of methane with air. Catalytically active forms of oxides of metals such as copper, iron, nickel, cobalt, manganese and silver, as well as active or finely divided metals of the platinum group, particularly when enhanced by promoters of the rare earth groups, especially cerium, are examples of catalytic materials usefu. in promoting the oxidation of carbon monoxide at relatively low temperatures.

The catalytic materials may be deposited as such on the hot junctions of the thermocouples or, alternatively, they may be previously mixed with ceramic or other similar insulating material prior to application to the thermocouple of the junctions in order to minimize the possibility of any interference with the electrical energy-producing ability of the couple. The catalytic materials can be deposited on the hot junction of the thermocouple in any convenient way, so long as the selected method of deposition results in a catalytically active form of the material being deposited. The observance of the latter condition is important, as the physical condition of contact catalysts is of vital importance as regards their activity as catalysts. The requirement of high catalytic activity together with whatever reaction specificity may be necessary can usually be satisfied by preparing a contact catalyst with a highly developed surface area. The production of a large amount of surface results from the creation of small particle size within the catalyst and possibly favorable orientation of crystals or active centers. Conventional methods of preparing catalytic material of high surface area include ignition, precipitation, and skeletonizing. In the ignition method the catalyst is prepared by decomposition of a thermally unstable chemical compounnd containing the catalytic metal such as a nitrate, formate, oxalate, acetate, manganate, or the like. The precipitation method involves precipitation of catalytic material as an insoluble material, washing free of extraneous ions, and conversions to the ultimate catalytic agent. The crystal size and activity of the product will depnd upon the conditions of precipitation, that is, concentration of solutions, order and rate of mixing of solutions, temperature of precipitation, washing, drying, and subsequent treatment. Also classifiable as a precipitation method of catalyst preparation is the electrodeposition of pure catalytic metals, where the surface area of the deposited metal can be controlled by the rate of metal deposition. By way of example, excellent results have been obtained in the present invention by electrodeposition of platinum on the hot junction of a thermocouple. In the preparation of skeleton catalysts a highly active catalyst is produced, for example, by leaching out one component of an integral mixture such as an alloy, leaving a skeleton structure of the desired catalytic metal. Any of the methods of catalyst preparation described generally above as well as other methods suitable for the purposes of this invention may also involve a final conversion of the catalytic particles into the active state required by the particular exothermic reaction to be promoted. For example, the last step in the preparation of a catalytic agent may involve reduction of an oxide to the metallic state by any suitable method. Alternatively, the final activation step can involve pretreatment with an inert gas, oxygen, hydrogen sulfide, or carbon monoxide to form dehydrated, oxidized, sulfided, or carbided catalysts, respectively.

As previously indicated, the present invention is useful with thermocouples prepared from any two dissimilar materials capable of producing a thermoelectric effect. Conventional thermocouples of the types normally employed in temperature measuring devices are quite satisfactory for the purposes of this invention. It may be noted that thermocouple components are normally chosen with regard to the use to which they are put in order to minimize damage to the thermocouple under service conditions. Thus, inasmuch as the thermocouples described herein will usually be employed in an oxidizing atmosphere, it is preferred to employ thermocouples that perform best in oxidizing atmospheres. By way of example, excellent results have been obtained with Chromel-Alumel thermocouples, which perform best in oxidizing atmospheres. Platinum-platinum rhodium thermocouples are also useful in oxidizing atmospheres as well as reducing atmospheres. Although the invention is useful in connection with the common thermocouples of the type indicated above, it can also be used in connection with semi-conductors, which although at present are rather costly, are generally regarded as superior materials for thermoelectric power conversion. Examples of such semiconductors useful in the formation of thermocouples are silicon, germanium, selenium and tellurium, and aluminum, gallium, and indium phosphides and arsenides, and cadmium, zinc, and lead sulfides and selenides. The invention can also be used in conjunction with ceramic thermocouples. Examples of such thermocouples which have been found to exhibit relatively long life at higher temperatures in an oxidizing atmosphere are couples of silicon carbide-graphite and couples formed from silicon carbides of different compositions.

The fuel reactants that can be used to activate the thermoelectric generators of this invention can be any reactants capable of reacting exothermically. Normally, the fuel reactants with which the thermoelectric generators of this invention will be employed will be combustible mixtures of air or oxygen and some oxidizable gaseous (including vaporous) material. As pointed out previously excellent results are obtainable with hydrogen and air as the fuel reactants. Other fuel reactants that can be employed to activate the thermoelectric generators of this invention include carbon monoxide, mixtures of carbon monoxide and unburned hydrocarbons of the kind found in the exhaust gases of internal combustion engines, mixtures of carbon monoxide and other combustion products of the kind found in the exhaust gases of gas or oil furnaces and the like, all of which are oxidizable by air or oxygen. Examples of other materials, which in gaseous or vaporous form together with air or oxygen, form suitable fuel reactant mixtures for use in the thermoelectric generators of this invention include methane, gasoline, kerosene, furnace oil, diesel fuel, methyl alcohol, ethyl alcohol, and others.

The improved thermoelectric generating devices of this invention find utility when employed in any system in which unburned oxidizable gases and air or oxygen are available, such as in exhaust manifolds of internal combustion engines, preheater systems for gas furnaces, by-product gas systems in steel mills, waste stack gases and the like. Although the thermoelectric generating devices of this invention find especial utility in systems involving waste unburned gases, the invention is not limited thereto and the hereindescribed devices can be employed where the primary purpose of the fuel gas is to heat the thermocouples of the thermoelectric device. In whatever use the devices of this invention are employed, care should be taken to avoid flame combustion in the power-generating section thereof in order to realize greatest benefits from the concentration of available heat at the thermocouple hot junctions. This can be achieved either by the provision of fuel mixtures that as such will not support flame combustion, and/or by the provision of thermocouples of such small mass as to be incapable of igniting the fuel mixture.

Referring now to the drawings in detail, in FIGURE 1 there is illustrated the hot junction of a thermocouple catalytically coated in accordance with the present invention. Numerals 2 and 4 denote, respectively, lead wires to two dissimilar materials capable of producing a thermoelectric effect, for example, Chromel-Alumel. Numeral 6 denotes the hot junction of the two dissimilar elements. The hot junction of the thermocouple can be formed by simply twisting the wires together as illustrated or, alternatively, they can be fused together if desired. Numeral 8 denotes a coating of a catalytically active material, such as platinum, deposited on the hot junction of the thermocouple.

Referring now to FIGURE 2, numeral 10 denotes a hollow, cylindrical thermopile element containing a plurality of annular arranged, linearly connected thermocouples having their hot junctions 12 disposed on the inside of the thermopile element 10 and their cold junctions 14 disposed on the outside of the thermopile element 10. Thermocouple hot junctions 12 are provided with a suitable catalytic coating as illustrated in FIGURE 1. Cylindrical thermopile element 10 can be prepared by forming a number of rings of a refractory cement containing the thermocouple hot junctions arranged therethrough in an annular fashion. The thermopile element 10 can then be suitably formed by cementing a plurality of the preformed rings together, one above the other, followed by joining adjacent outer thermocouple leads of the adjacent rings to form thermocouple cold junctions 14. Numerals 16, 18, 20, and 22 denote the lead wires of two of the linearly connected thermocouple groups, which wires are connected in series or in parallel to an external circuit, not shown, of the illustrated thermoelectric generator. Numeral 24 denotes a conduit of a waste gas system, for example, the exhaust line of an internal combustion engine into which thermopile element 10 is inserted. Numeral 26 denotes an electrically insulating, thermally conducting material such as mica. Numeral 28 denotes a cylindrical jacket surrounding the insulating material 26 and the thermopile cold junction 14. A heat transfer medium such as water may be circulated through chamber 30 of jacket 28 by means of inlet 32 and outlet 34 in order to maintain the maximum possible temperature differential between thermocouple cold junctions 14 and hot junctions 12, whereby the efficiency of the thermoelectric generator is maintained at a relatively high level.

In operation, hot incompletely burned exhaust gases, at or above the activation temperature of the thermocouple hot junction catalyst, and containing a noninflammable mixture of unburned gasoline hydrocarbons and thermal degradation products thereof, carbon monoxide and air, are passed longitudinally through exhaust line 24 and through thermopile element 10 contacting platinum coated hot junctions 12. Oxidation of unburned hydrocarbons and carbon monoxide by the unconsumed oxygen in the exhaust gas takes place solely on the catalyst surface of thermocouple hot junctions 12, which, as a consequence, become heated to a degree substantially higher than the temperature of the exhaust gases as such, whereby an electric current of greater magnitude than could be produced by the heat of the hot exhaust gases as such is generated in the thermopile.

It has been found that in some instances combustion promoting catalysts lose the ability to promote combustion at ambient temperatures after having once been heated to incandescence. Nevertheless, even in these instances the capacity to promote combustion will be retained by the catalysts at elevated temperatures. In instances of the use of heat-activated catalysts with fuel mixtures that are not heated by some previous use, a preheating or starting system can be used. FIGURE 3 illustrates one possible scheme by which this can be accomplished. The apparatus shown consists essentially of a spark plug igniting device 40, a heat exchanger 42, a power-generating chamber 44, containing thermocouples 46, and a thermocouple-operated device 48 for shutting off the spark plug igniter. When starting up the generator, the fuel-air mixture is started into the apparatus and the starting switch 50 is closed. The solenoid switch 48 is spring loaded to be normally closed; thus, current flows from the battery 52, activating the spark plug 40 and igniting the fuel-air mixture. As the hot gases from the preliminary combustion pass through the heat exchanger 42 into the power-generating chamber 44, the temperature of that chamber is raised to the activation temperature, for example 300° F., of the catalyst, for example platinum, that is deposited on the hot junctions of thermocouples 46. The first bundle of thermocouples 47 is connected to the coils of solenoid switch 48, which is so designed that the current generated by the thermocouples 47 at the proper operating tmeperature activates the solenoid plunger, opens the switch 54 and stops the spark plug 40 from further firing. The fuel jet is so designed that the flame is quenched as soon as the spark plug is turned off and the fuel mixture is automatically changed, for reasons explained above, to a noninflammable mixture, preferably by action of the same solenoid 48. The catalytically coated thermocouples 46, now temperature activated, promote flameless combustion of the fuel-air mixture on their surfaces and generate power concurrently. This power is removed through the power leads 56 as shown. The burned gases are exhausted through the heat exchanger 42, thereby maintaining the fuel-air mixture at the activation temperature.

It will be noted that the thermocouples are shown connected in parallel only as a matter of convenience. Actually they can be coupled in series, in bundles and each bundle connected in parallel, or in whatsoever manner the power requirements dictate.

The effectiveness of the herein-disclosed invention has been demonstrated by placing a platinum-tipped Chromel-Alumel thermocouple in a nonburning, air-hydrogen gas stream. The gas stream issued from a Bunsen burner where hydrogen was fed as though it were to be burned while air was aspirated in the normal manner. The thermocouples employed in the experiment were plated by passing one to two amperes of electrical current for about one to five minutes at about a six-volt potential through a water solution containing approximately five percent platinum chloride. The thermocouples as such were employed as the cathode of the circuit while a graphite cup containing the platinum chloride solution was employed as the anode and the electrolyte. In one experiment the platinum-tipped thermocouple was found to produce about 1.5 millivolts of electrical current, or about 0.5 millivolt above the base voltage normally produced by a nonplatinum-tipped couple of the same kind at the temperature (ambient) of the gas stream. During two other experimental runs the plated portion of the thermocouples reached incandescence in the flameless gas stream while producing better than two millivolts (off-scale of the recorder) of potential from each couple. The localized heating was so intense in one of these instances that the couples was destroyed.

Many modifications and variations of the invention as described herein will suggest themselves to those skilled in the art, and resort may be had to such modifications and variations without departing from the spirit or scope of the invention. Accordingly, only such limitations should be imposed on the invention as are indicated in the claims appended hereto.

I claim:

1. A thermocouple having a coating of a catalytic material on its hot junction, said catalytic material being a material that is capable of promoting an exothermic reaction of fuel reactants contacted therewith, the leads of said thermocouple being noncatalytic with respect to said reaction.

2. The thermocouple of claim 1 where the catalytic material is a nobel metal in catalytic form.

3. The thermocouple of claim 1 where the catalytic material is platinum.

4. A thermopile comprising a plurality of electrically connected thermocouples whose electrical connections form a plurality of hot junctions and cold junctions, means separating the hot junctions of said thermocouples from said cold junctions and forming a closed combustion chamber containing said thermocouple hot junctions and having an inlet and an outlet, said hot junctions having a coating of a catalytic material thereon that is capable of promoting an exothermic reaction of fuel reactants contacted therewith, the leads of said thermocouple being noncatalytic with respect to said reaction.

5. A thermoelectric generating device comprising a thermopile having a plurality of electrically connected thermocouples whose electrical connections form a plurality of hot junctions and cold junctions, means separating the hot junctions of said thermocouples from said cold junctions and forming a combustion chamber containing said hot junctions and having an inlet and an outlet, said hot junctions having thereon a catalytic material that is capable of promoting an exothermic reaction of fuel reactants contacted therewith, the leads of said thermocouple being noncatalytic with respect to said reaction, an inlet conduit connected to the inlet of said combustion chamber for introducing fuel gases therein, an exhaust conduit connected to the outlet of said combustion chamber for removing combustion gases from said combustion chamber, heat exchanger means associated with said exhaust conduit and said inlet conduit adapted to transfer heat from hot combustion gases in the exhaust conduit to fuel gases in the inlet conduit.

6. The thermoelectric generating device of claim 5, including an electrical fuel igniting device in said inlet conduit, and means for controlling said electrical fuel igniting device in response to thermoelectric power generated by said thermopile.

References Cited in the file of this patent

UNITED STATES PATENTS

| | | |
|---|---|---|
| 537,242 | Simonds | Apr. 9, 1895 |
| 2,490,196 | Beach | Dec. 6, 1949 |
| 2,901,523 | Justi et al. | Aug. 25, 1959 |

UNITED STATES PATENT OFFICE

CERTIFICATE OF CORRECTION

Patent No. 3,070,645 December 25, 1962

Joseph H. Tracht

It is hereby certified that error appears in the above numbered patent requiring correction and that the said Letters Patent should read as corrected below.

Column 2, line 39, for the indistinct word at the end of the line, read -- useful --; column 4, line 33, for "to" read -- of --; column 5, line 22, for "heat-activated" read -- heat-deactivated --; column 6, line 13, for "couples" read -- couple --.

Signed and sealed this 25th day of June 1963.

(SEAL)
Attest:

ERNEST W. SWIDER
Attesting Officer

DAVID L. LADD
Commissioner of Patents